US007184205B1

(12) United States Patent
Lynch

(10) Patent No.: US 7,184,205 B1
(45) Date of Patent: Feb. 27, 2007

(54) ELECTROMAGNETIC ARRAY STRUCTURE CAPABLE OF OPERATING AS AN AMPLIFIER OR AN OSCILLATOR

(75) Inventor: Jonathan J. Lynch, Oxnard, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 11/347,709

(22) Filed: Feb. 3, 2006

(51) Int. Cl.
*H01S 3/00* (2006.01)

(52) U.S. Cl. ........................................ 359/333; 331/56

(58) Field of Classification Search ................ 359/333; 331/56, 107 DP, 96; 333/230
See application file for complete search history.

(56) References Cited

U.S. PATENT DOCUMENTS 4,742,314 A * 5/1988 Mink .......................... 331/56
5,392,152 A * 2/1995 Higgins et al. ............. 359/333
6,982,676 B2 * 1/2006 Sievenpiper et al. ........ 343/754

FOREIGN PATENT DOCUMENTS

WO WO 02/099960 A1 * 12/2002

* cited by examiner

*Primary Examiner*—Mark Hellner
(74) *Attorney, Agent, or Firm*—Ladas & Parry LLP

(57) ABSTRACT

An apparatus and methods for operating a single quasi-optical structure are disclosed. The apparatus operates as an amplifier or an oscillator. The method disclosed teaches how to operate the single quasi-optical structure as an amplifier or an oscillator.

22 Claims, 13 Drawing Sheets

ELECTROMAGNETIC ARRAY STRUCTURE CAPABLE OF OPERATING AS AN AMPLIFIER OR AN OSCILLATOR

CROSS REFERENCE TO RELATED APPLICATIONS

This application is related to co-pending application U.S. application Ser. No. 11/347,707, filed on the same date as the present application, for "Lens Structure for Coupling Power" by Jonathan Lynch, the disclosure of which is incorporated herein by reference. This application is related to co-pending application U.S. application Ser. No. 10/664,112, filed on Sep. 17, 2003, for "Bias Line decoupling method for monolithic amplifier arrays" by Jonathan Lynch, the disclosure of which is incorporated herein by reference.

FIELD OF THE INVENTION

This technology relates to a single quasi-optical structure capable of operating as an amplifier or an oscillator.

BACKGROUND AND PRIOR ART

Power is difficult to produce at millimeter wave frequencies due to the low power output of transistors and the losses incurred by traditional power combiners at these frequencies. Free space combining, also called "quasi-optical" combining, eliminates the latter problem by allowing electromagnetic energy to combine in free space. Quasi-optical arrays can provide high power by combining the outputs of many (e.g. thousands) of elements.

Quasi-optical amplifiers arranged in arrays have been developed by a number of groups to produce high output powers at millimeter wave frequencies. These amplifier arrays amplify incoming radiation, either through reflection or transmission, and reradiate energy typically in a (more or less) gaussian mode. The amplifiers usually utilize crossed input and output polarizations in order to reduce input/output coupling and avoid oscillation.

Quasi-optical sources (oscillators) arranged in arrays have also been developed for millimeter wave power, and consist of a number of individual oscillators that are coupled together so that they mutually synchronize in phase and the radiation from all the elements combines coherently, typically in a (more or less) gaussian mode in front of the oscillator array. A number of different methods exist to realize the coupling network, from printed circuit transmission lines to partial reflectors. The key is to provide strong coupling between elements to ensure in-phase oscillation.

Many quasi-optical oscillator arrays utilize hardwire circuitry (e.g. printed circuits, waveguides) to couple together the oscillating elements. For these types of arrays it is very difficult to control or modify the coupling in real time, without resorting to complicated schemes that are difficult to realize. For quasi-optical arrays that utilize partial reflectors, the oscillators are usually one port devices (negative resistance oscillators) with a single polarization output, which increases parasitic mutual coupling, creating difficulty in controlling the coupling between elements.

The present disclosure takes quasi-optical arrays one step further by allowing the amplifier coupling to be easily controlled so that the array can be operated as an amplifier or as a coherent source, depending on the amount of array coupling set by the user.

SUMMARY

According to the present disclosure, quasi-optical structures capable of operating as an amplifier or an oscillator are disclosed.

According to a first aspect, an electromagnetic array structure capable of operating as an amplifier or an oscillator is disclosed, comprising: a plurality of active amplification devices arranged in an array, wherein an input of each active amplification device is cross polarized with respect to an output of each active amplification device, a curved partial reflector disposed in a spaced relation with the plurality of active amplification devices, a plurality of elongated conductors disposed along a first major surface of said partial reflector at a first angle to the input of the plurality of active amplification devices so as to couple cross polarized input and output of each active amplification device, wherein said electromagnetic array operates as an amplifier by setting said first angle so as to cause incoming energy to be absorbed by the input of each active amplification device, amplified and reradiated in the crossed polarization from the output of each active amplification device and said electromagnetic array operates as an oscillator by setting said first angle so as to induce oscillations and synchronize said plurality of active devices to produce coherent power According to a second aspect, an electromagnetic array structure is disclosed, comprising: a plurality of active amplification devices arranged in an array, wherein an input of each active amplification device is cross polarized with respect to an output of each active amplification device, a partial reflector disposed in a spaced relation with the plurality of active amplification devices, wherein said partial reflector contains at least one curved major surface, a plurality of elongated conductors in a curved plane disposed in or on said reflector at a first angle to the input of the plurality of active amplification devices so as to couple cross polarized input and output of each active amplification device.

According to a third aspect, a method for operating an electromagnetic array structure as an amplifier or an oscillator is disclosed, comprising: arranging a plurality of active amplification devices in an array, wherein an input of each active amplification device is cross polarized with respect to an output of each active amplification device, providing a curved partial reflector rotationally in a spaced relation with the plurality of active amplification devices, providing a plurality of conductors along a first major surface of said partial reflector at a first angle to the input of plurality of active amplification devices so as to couple cross polarized input and output of each active amplification device, rotating said curved partial reflector to a first position so as to cause an incoming energy to be absorbed by the input of each active amplification device, amplified and reradiated in the crossed polarization from the output of each active amplification device, rotating said curved partial reflector to a second position so as to synchronize said plurality of active devices to produce coherent power.

BRIEF DESCRIPTION OF THE FIGURES AND THE DRAWINGS

DETAILED DESCRIPTION

The present disclosure provides an apparatus and a method for generating high power either as a source or as an amplifier at millimeter wave frequencies, using an array of amplification devices and associated circuitry. The disclosed apparatus produces high output power as either an amplifier or as a source with a very simple change of configuration. This permits the end user to choose whichever configuration applies to his application, and allows the manufacturer to fabricate a single unit serving dual purposes, thus reducing costs.

Figure 1:
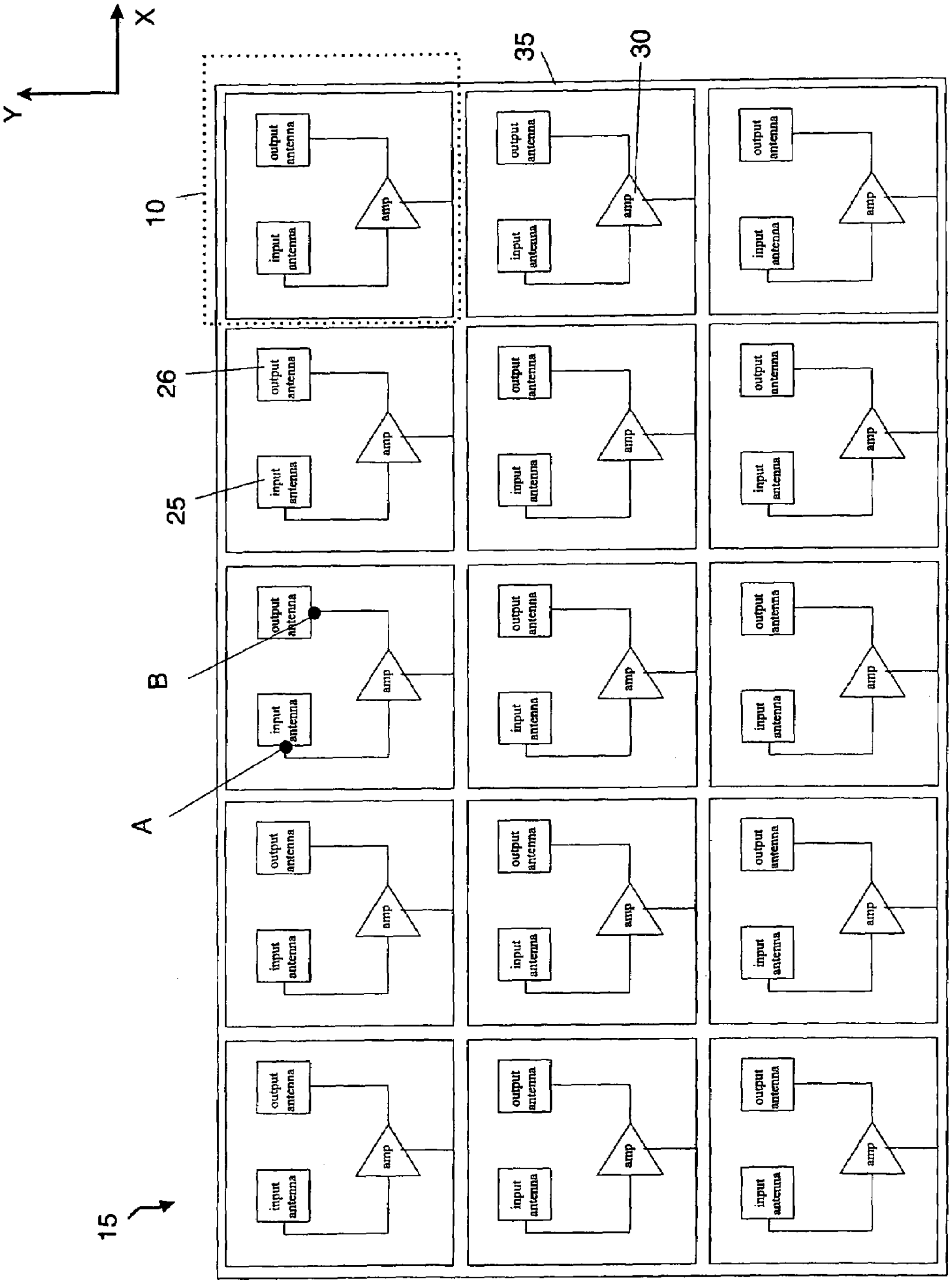
FIG. 1 depicts an array of amplification devices.
Figure 2:
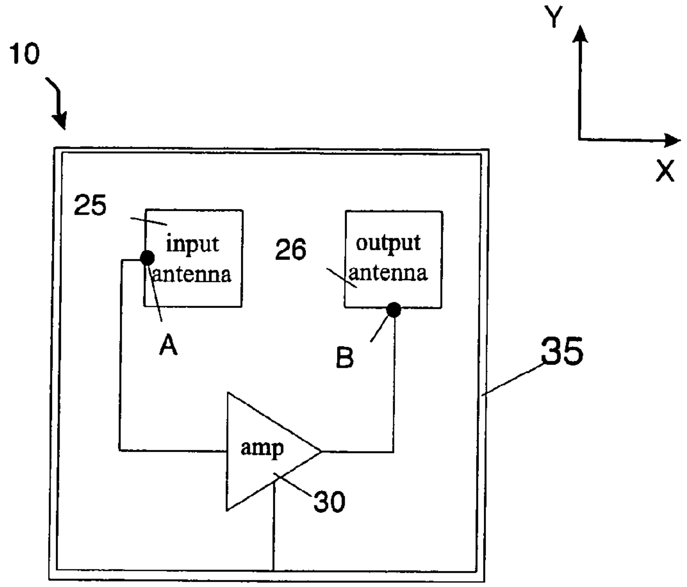
FIG. 2 depicts an amplification device.

The disclosed apparatus utilizes amplification devices 10 with crossed input/output polarizations arranged in an array 15, as depicted in FIGS. 1 and 2. The amplification device 10 depicted in FIGS. 1 and 2 includes a ground plane (not shown), two patch antennas, namely input antenna 25 and output antenna 26, as well as an amplifier 30, and a bias grid 35 supplying bias voltage to the amplifier 30, as disclosed in more detail in U.S. patent application Ser. No. 10/664,112, which is incorporated herein by reference in its entirety. It is to be understood that patch antennas are only used as an example and that radiating elements like horn, slot, cavity backed slot, cavity backed patch, and dipole, can also be used for the disclosed apparatus.

The input antennas 25, as depicted in FIGS. 1 and 2, are polarized in the X direction by outputting the incoming energy at point A of the input antennas 25. Hence, only the energy polarized in the X direction will propagate from the input antennas 25 to the amplifiers 30. The output antennas 26, as depicted in FIGS. 1 and 2, are polarized in the Y direction by inputting amplified energy from the amplifiers 30 at point B of the output antennas 26. Hence, the output antennas 26 will reradiate the energy polarized in the Y direction.

Although the input antennas 25, depicted in FIGS. 1 and 2, are polarized in the X direction and the output antennas 26, depicted in FIGS. 1 and 2, are polarized in the Y direction, it is to be understood that the input antennas 25 can be polarized in any direction. However, maintaining a cross polarization of the input antennas 25 and output antennas 26 reduces parasitic coupling and improves the coupling control as will become evident below.

Figure 3:
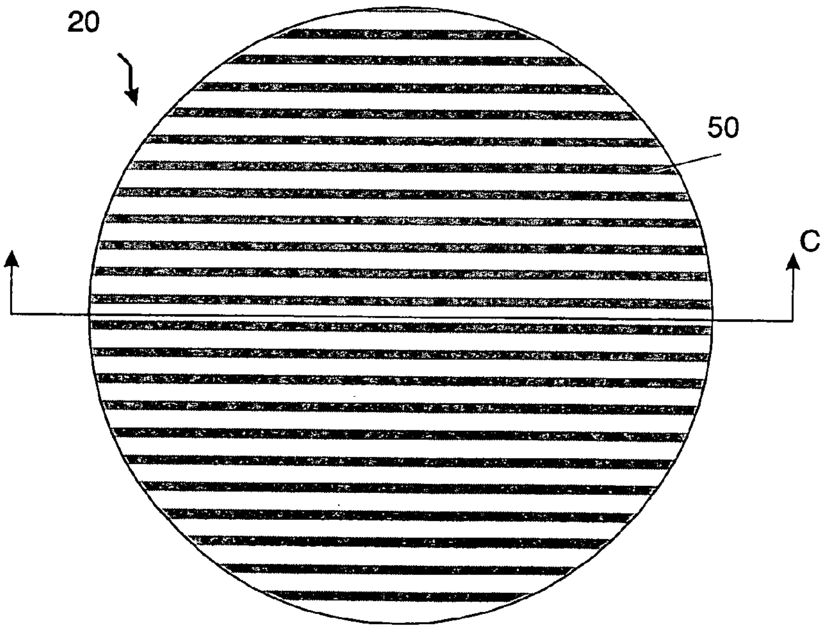
FIG. 3 depicts a reflector in accordance with the present disclosure.
Figure 4:
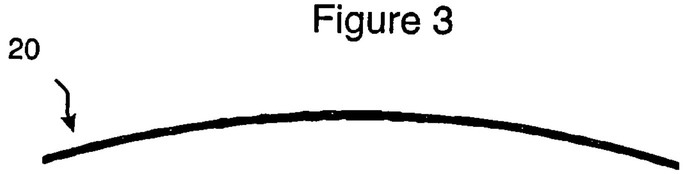
FIG. 4 depicts a side view of section C of the reflector in FIG. 3 in accordance with the present disclosure.

The disclosed apparatus further utilizes curved partial reflector 20 with conductors 50 disposed on the reflector's 20 surface, as depicted in FIG. 3 and FIG. 4. FIG. 3 depicts a top view of the reflector 20 and FIG. 4 depicts the section C side view of the reflector 20 depicted in FIG. 3.

Although the conductors 50 in FIG. 3 are represented as straight lines, it shall be understood that the conductors 50 can have different shapes, including but not limited to straight lines, crenulated lines and/or wavy lines, for this technology to work. The spacing between the conductors 50 may be anywhere from 1/50 of a wavelength of the energy to be transmitted to about ½ of the wavelength of the energy to be transmitted and the width of the conductors 50 may be about ⅛ of a wavelength of the energy to be transmitted.

Although the curved partial reflector 20 in FIG. 3 is represented as a circle, it shall be understood that the curved partial reflector 20 can have different shapes, including, but not limited to, square and/or rectangular shapes.

Figure 5:
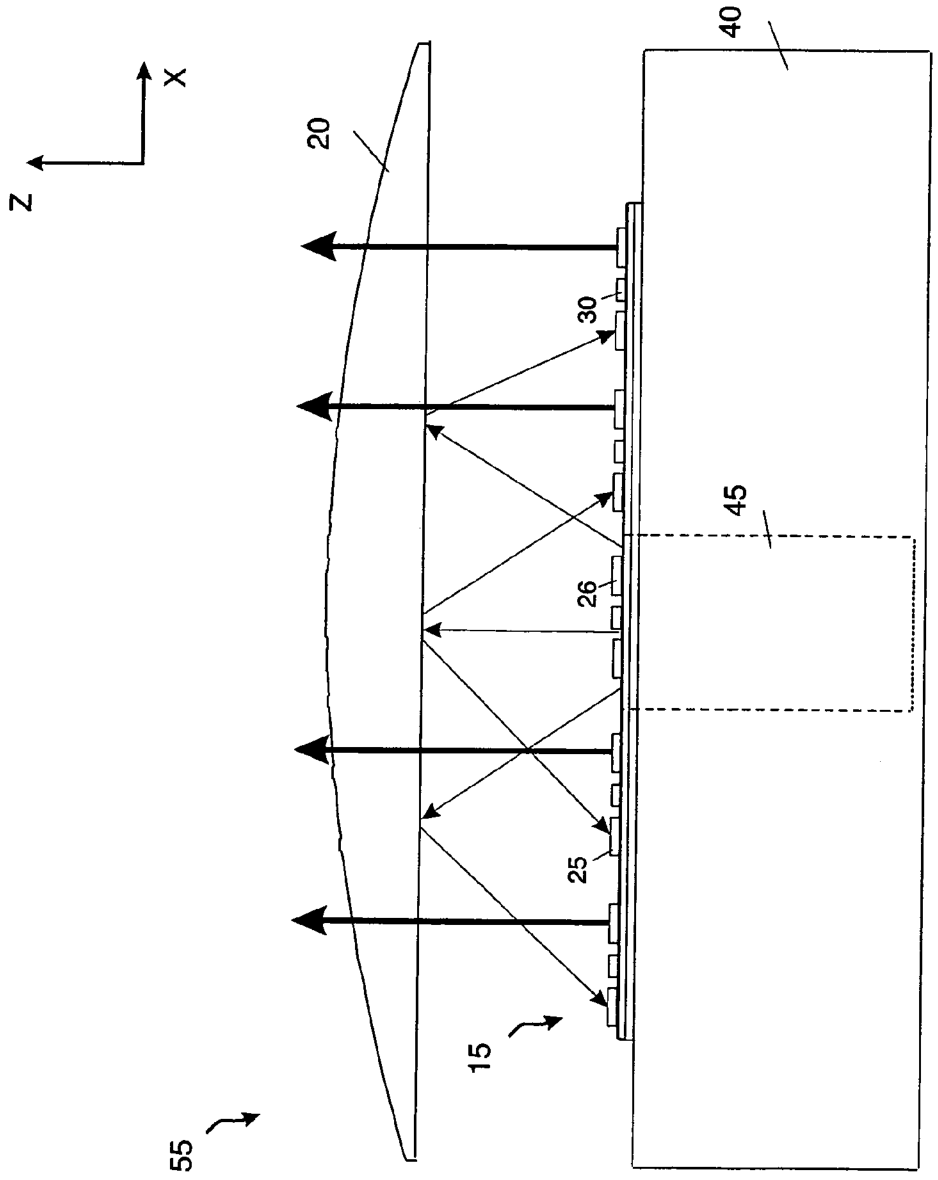
FIG. 5 depicts an exemplary embodiment of an amplifier/oscillator apparatus in accordance with the present disclosure.
Figure 6:
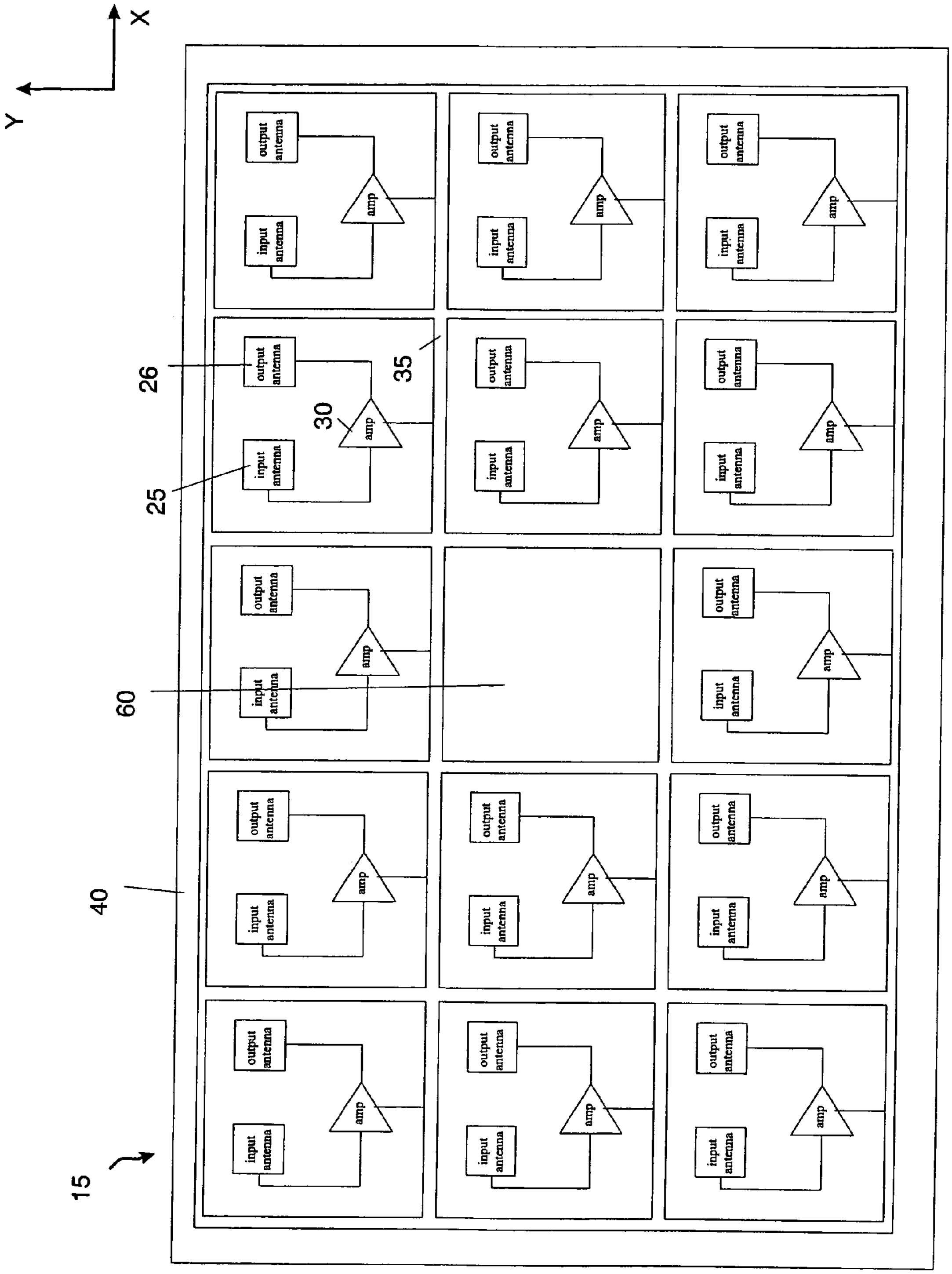
FIG. 6 depicts a top view of the array of amplification devices for the apparatus in FIG. 5 in accordance with the present disclosure.

In one exemplary embodiment, apparatus 55 depicted in FIG. 5 may operate as an amplifier/oscillator. FIG. 5 depicts the array 15 of amplification devices 10 disposed on a heatsink layer 40 with a waveguide 45 coupled with the array 15. FIG. 5 further depicts reflector 20 rotationally disposed above the array 15 of amplification devices 10. FIG. 6 depicts the top view of the array 15 of amplification devices 10 with an opening 60 for the waveguide 45.

Figure 7:
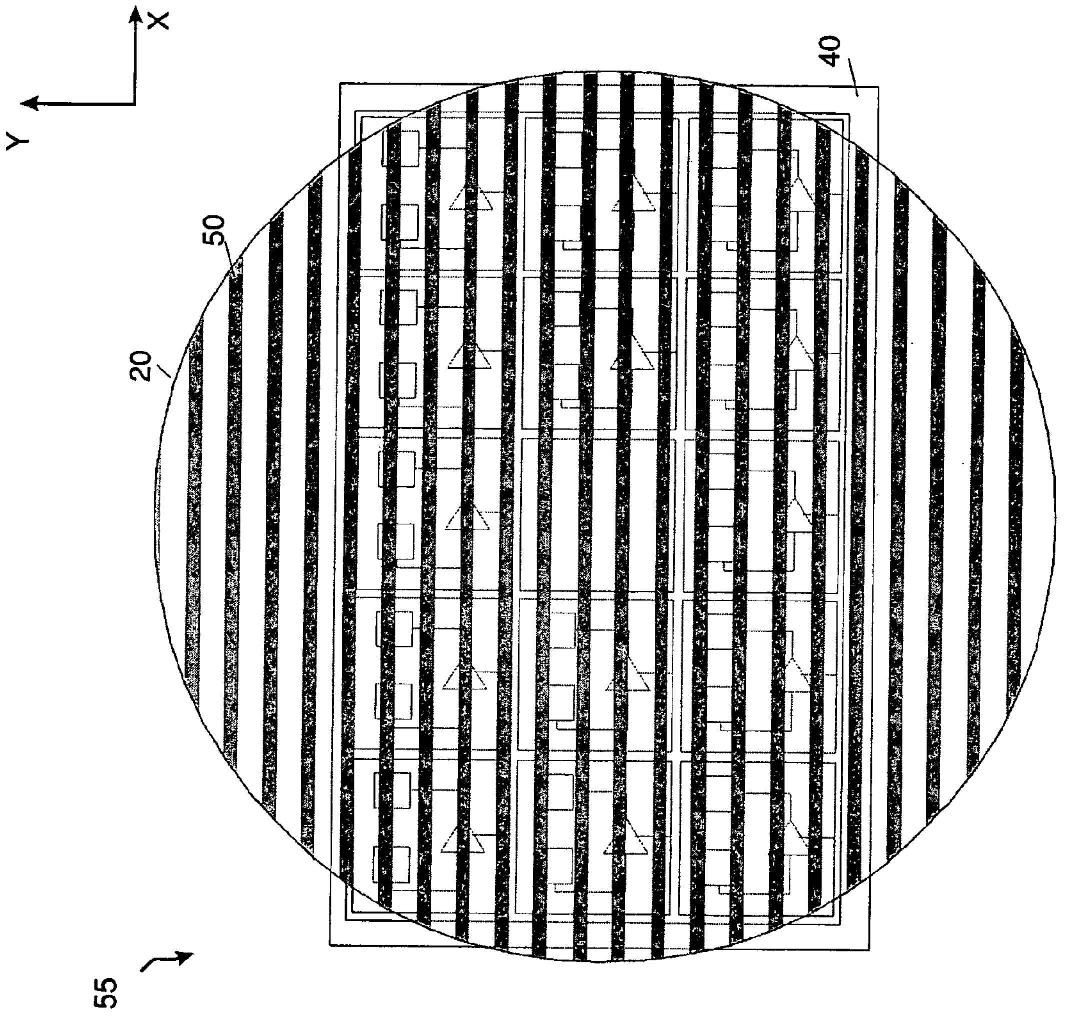
FIG. 7 depicts a top view of a reflector in relation to the array of the amplification devices for the apparatus in FIG. 5 in accordance with the present disclosure.

By rotating the reflector 20 so as to position the conductors 50 to be parallel with the polarization of the input antenna 25 in the X direction (for example), as shown in FIG. 7, the apparatus 55 operates as a high power amplifier. The energy from the opening 60 of the waveguide 45 is reflected off of the conductors 50, absorbed by the input antennas 25, amplified by amplifier 30 and is then reradiated by the output antennas 26 in the cross polarization, in the Y direction (for example), which allows it to pass mostly unaffected through the conductors 50 that are arranged orthogonal to the output energy in the Y direction. See FIG. 5.

Figure 8:
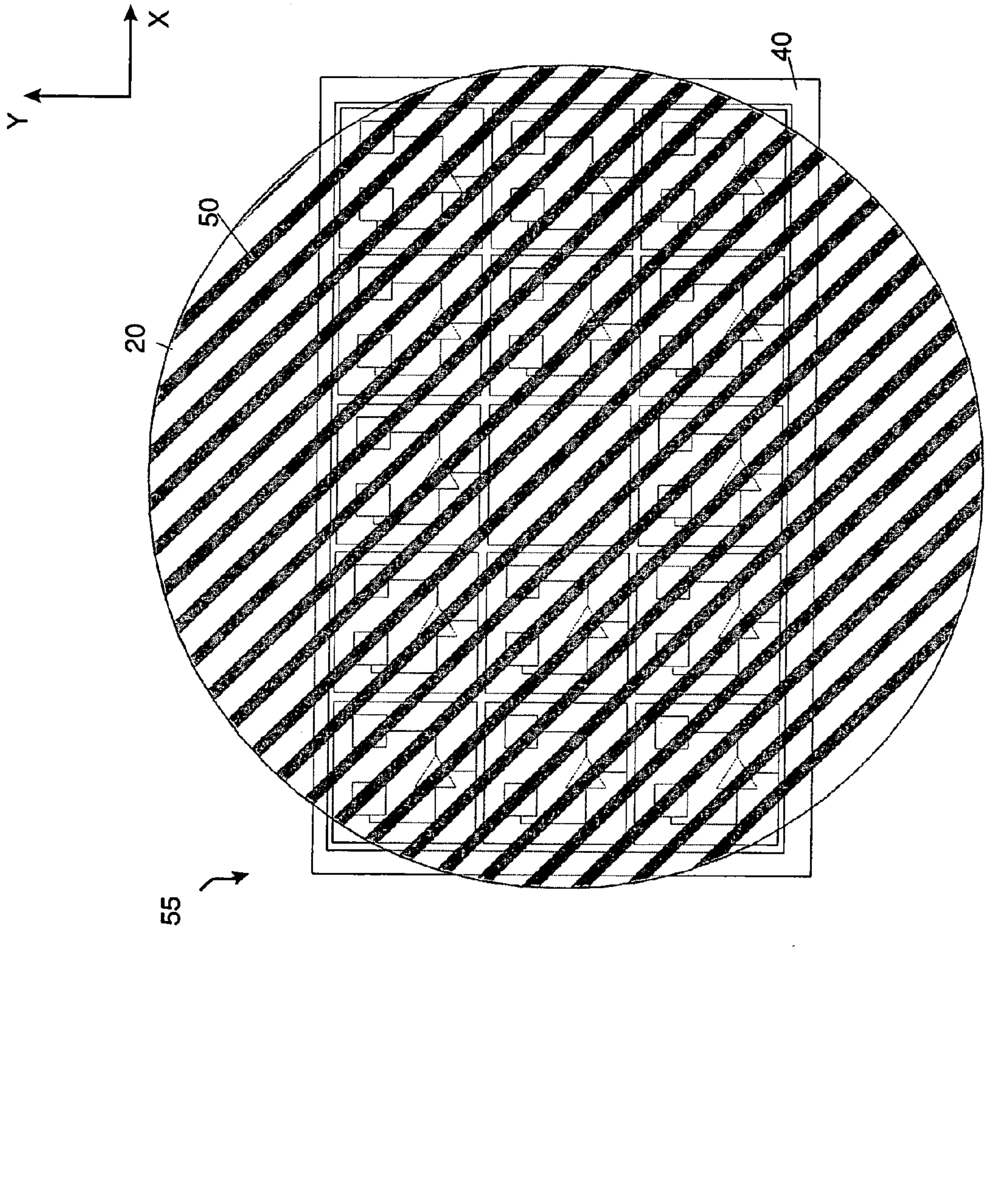
FIG. 8 depicts a top view of the reflector in relation to the array of amplification devices for the apparatus in FIG. 5 in accordance with the present disclosure.

By rotating the reflector 20 to another position, for example as depicted in FIG. 8, some of the output energy will be converted into cross polarized mode, thus coupling together the inputs and outputs. If the cross polarized coupling is increased beyond a certain threshold, by rotating the reflector 20, the array 15 of amplification devices 10 will oscillate causing the apparatus 55 to operate as an oscillator. The rotation of the reflector 20 may range from a few degrees to forty-five (45) degrees to cause the apparatus 55 to operate as an oscillator.

In FIGS. 7 and 8 the reflector 20 is depicted as being translucent in order to show the array 15 of amplification devices 10 below; however, it should be understood that the reflector 20 may well be opaque and is only shown as being translucent to help depict its overall relation to the underlying structure.

The reflector 20 and the array 15 shown in FIGS. 5, 7 and 8 and the amplification device 10 shown in FIGS. 1 and 2 are not drawn to scale. The diameter of the reflector 20 may be twice the width of the array 15 and the size of the amplification device 10 may be about ½ of a wavelength of the energy to be transmitted.

Figure 9:
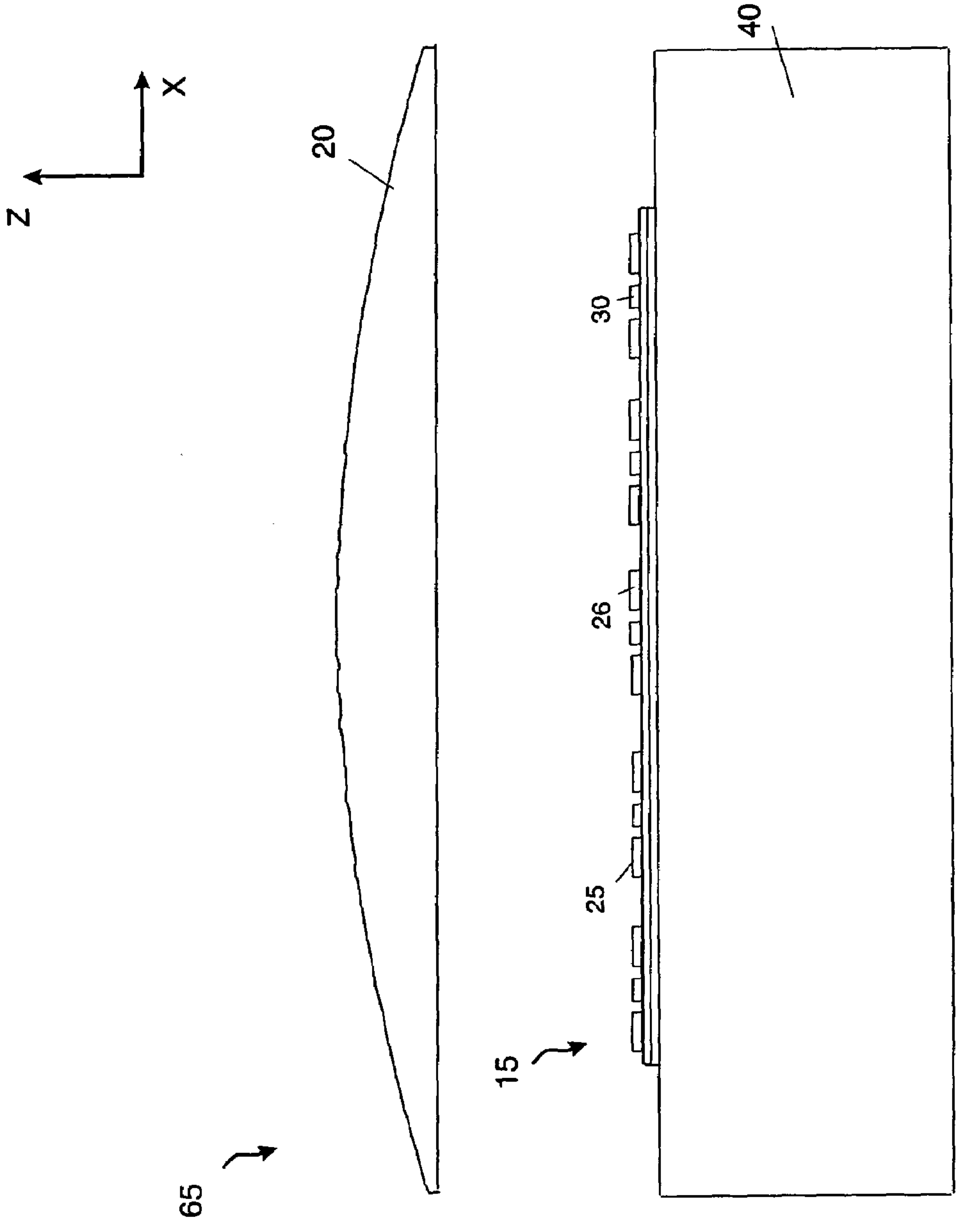
FIG. 9 depicts another exemplary embodiment of an amplifier/oscillator apparatus in accordance with the present disclosure.

In another exemplary embodiment, an apparatus 65 as depicted in FIG. 9 may operate as an amplifier/oscillator.

Figure 10:
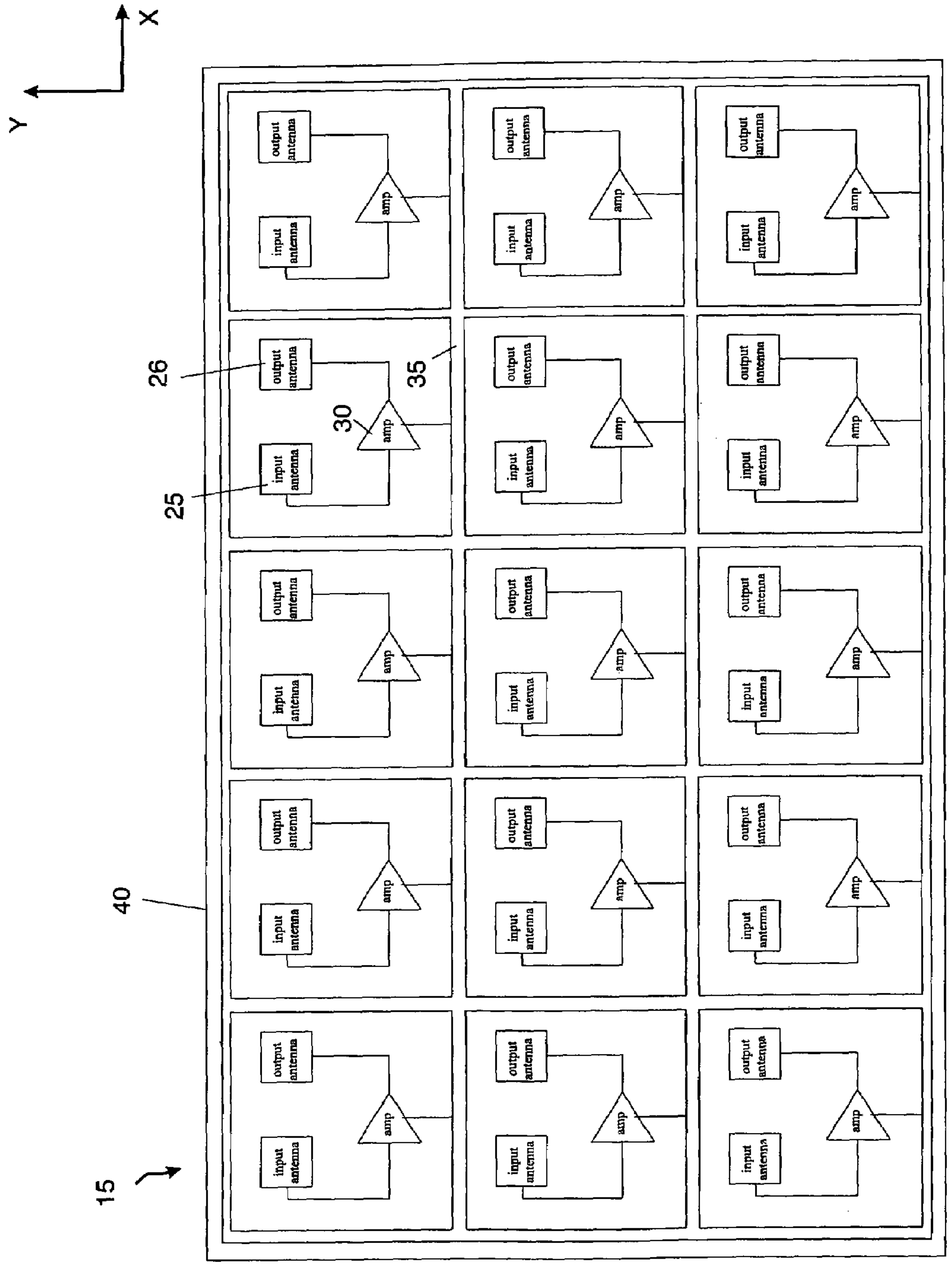
FIG. 10 depicts a top view of the array of amplification devices for the apparatus in FIG. 9 in accordance with the present disclosure.

FIG. 9 depicts the array 15 of amplification devices 10 disposed on a heatsink layer 40 with a reflector 20 rotationally and removably disposed above the array 15. FIG. 10 depicts the top view of the array 15 of amplification devices 10 without an opening for a waveguide.

Figure 11:
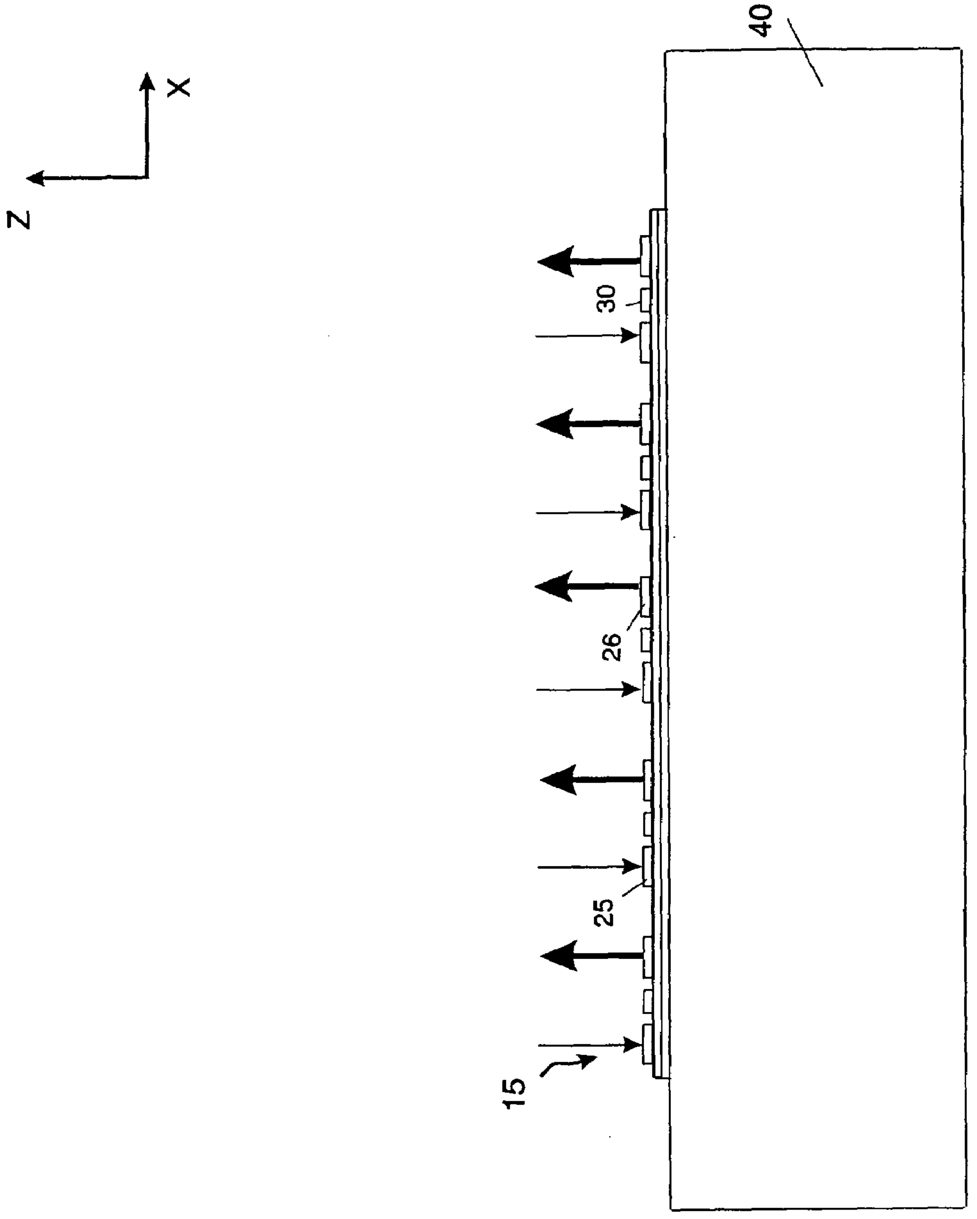
FIG. 11 depicts the amplification devices of FIG. 5 in amplification mode in accordance with the present disclosure.

By removing the reflector 20, as shown in FIG. 11, the apparatus 65 operates as a high power amplifier. The energy, polarized in the X direction (for example), is absorbed by the input antennas 25, amplified by amplifier 30 and is then reradiated, cross polarized in the Y direction, by the output antennas 26 in the Z direction.

Figure 12:
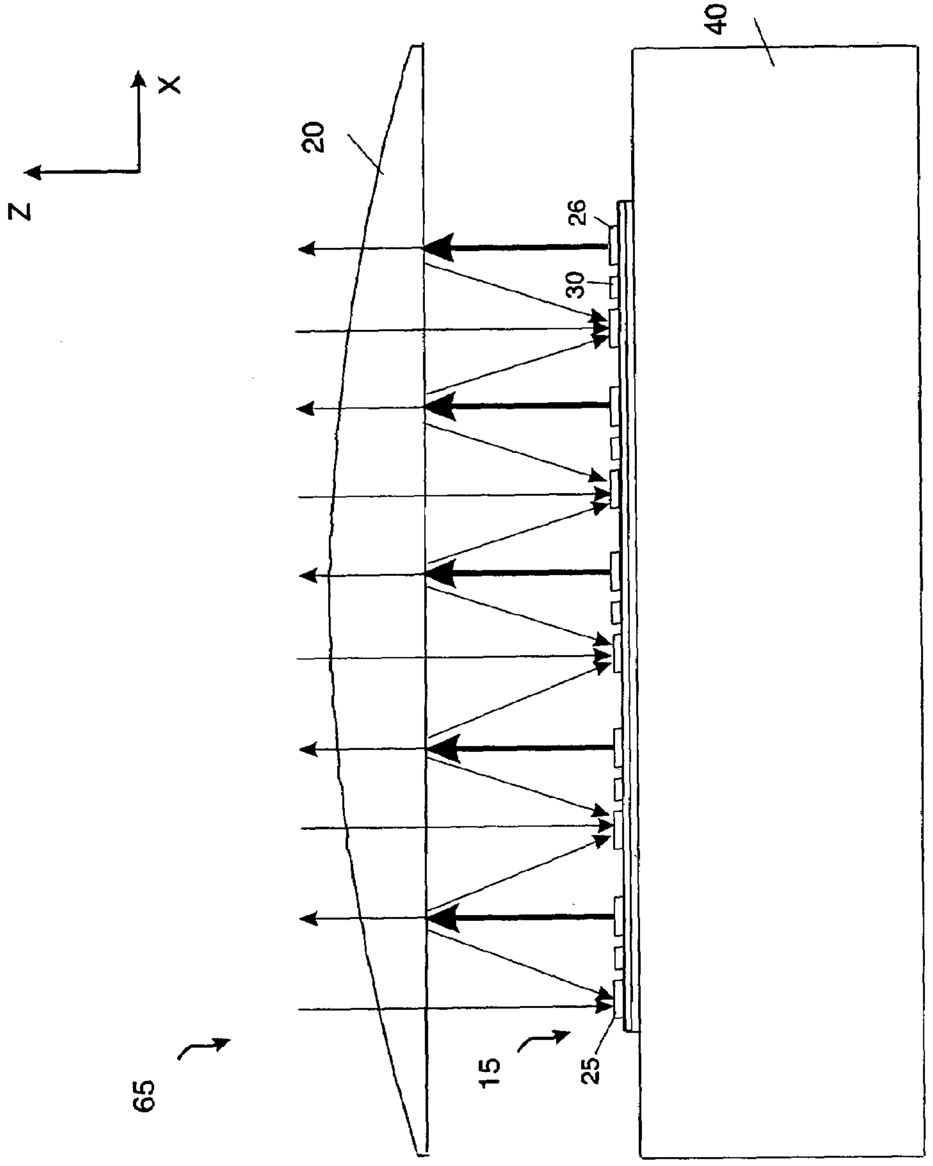
FIG. 12 depicts the amplification devices of FIG. 5 in oscillation mode in accordance with the present disclosure.
Figure 13:
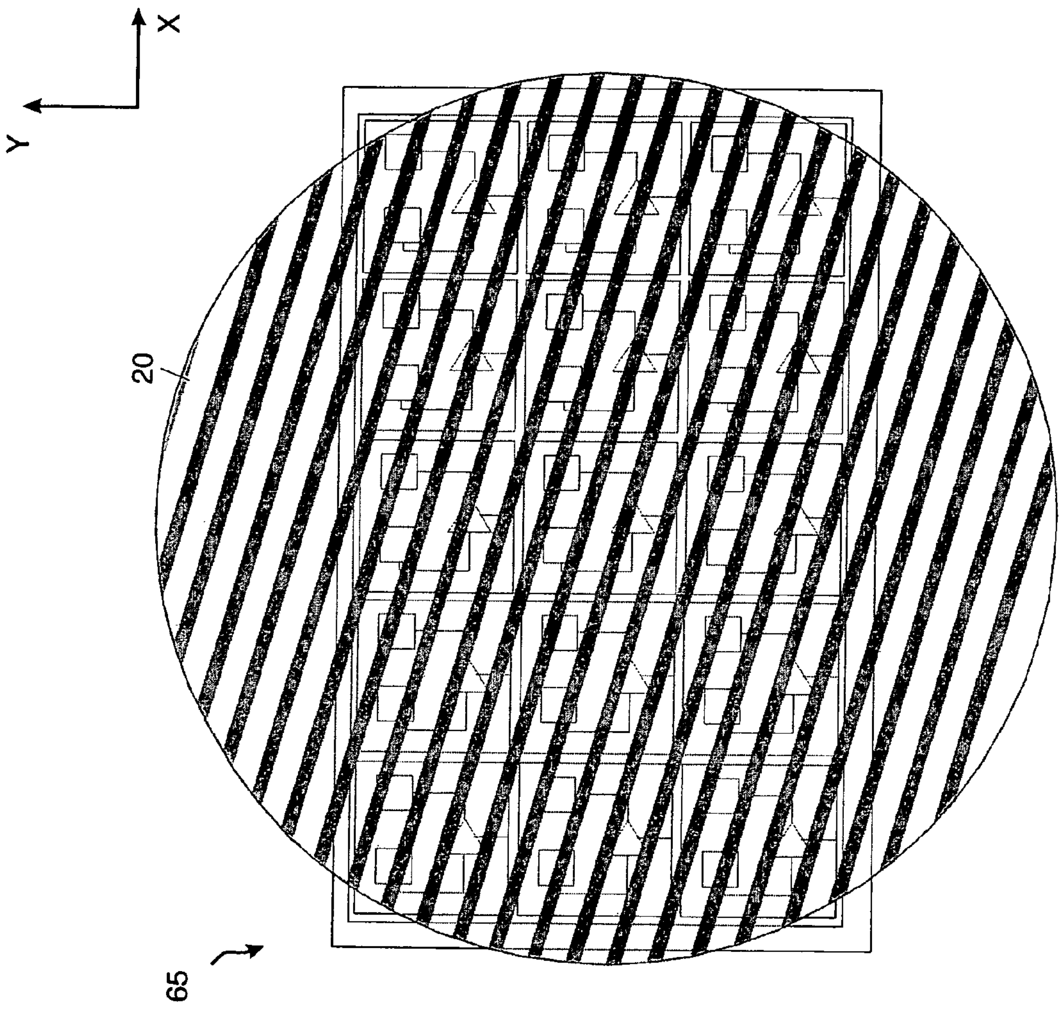
FIG. 13 depicts atop view of a reflector in relation to array of amplification devices for apparatus in FIG. 12.

By adding the reflector 20, for example as depicted in FIGS. 12 and 13, some of the output energy will be converted into cross polarized mode, thus coupling together the inputs and outputs. If the cross polarized coupling is increased beyond a certain threshold, by rotating the reflector 20, the array 15 of amplification devices 10 will oscillate causing the apparatus 65 to operate as an oscillator.

In FIG. 13 the reflector 20 is depicted as being translucent in order to show the array 15 of amplification devices 10 below; however, it should be understood that the reflector 20 may well be opaque and is only shown as being translucent to help depict its overall relation to the underlying structure.

The reflector 20 and the array 15 shown in FIGS. 9, 12 and 13 and the amplification device 10 shown in FIG. 10 are not drawn to scale. The diameter of the reflector 20 may be twice the width of the array 15 and the size of the amplification device 10 may be about ½ of a wavelength of the energy to be transmitted.

Figure 14:
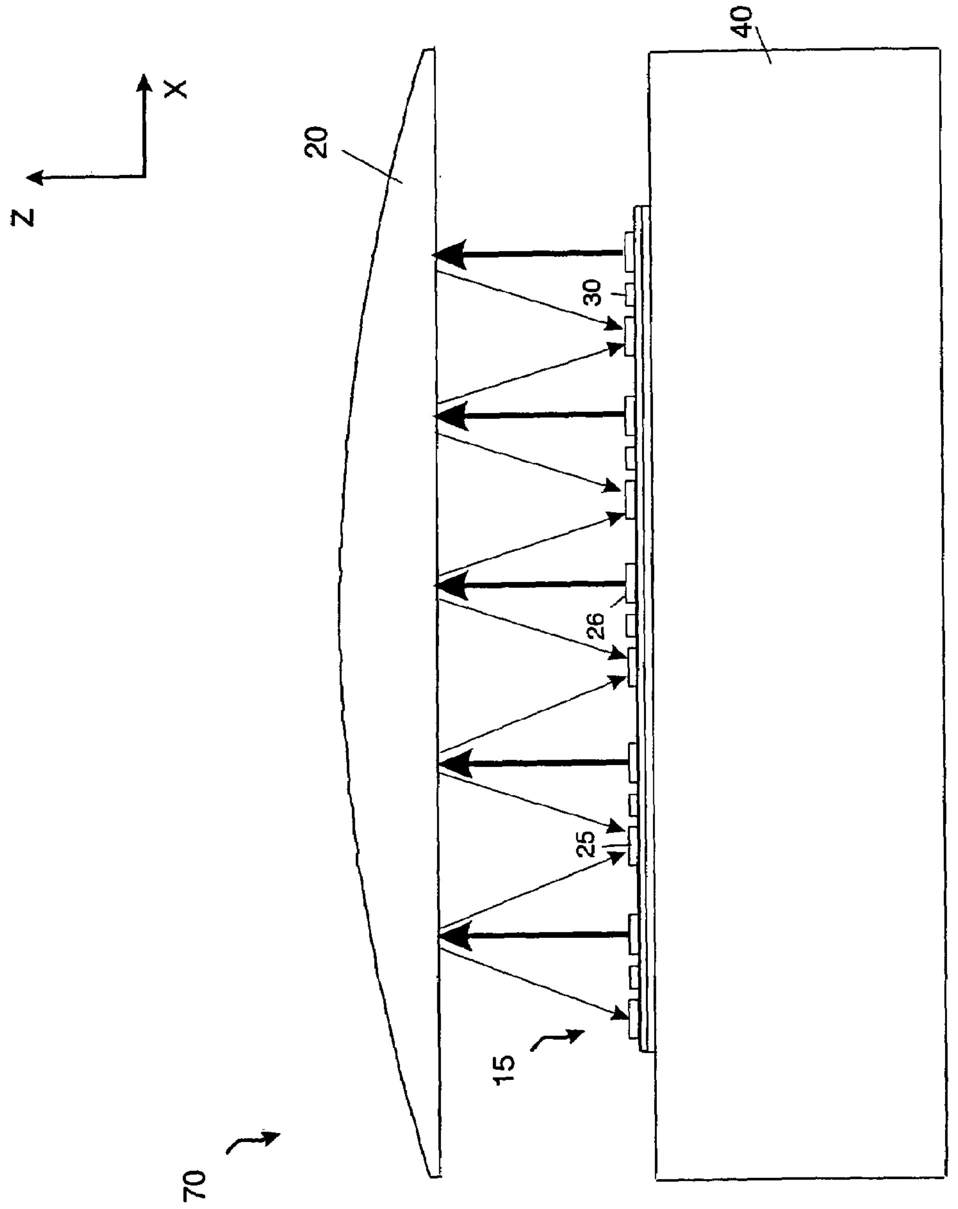
FIG. 14 depicts another exemplary embodiment of an oscillator apparatus in accordance with the present disclosure.

In another exemplary embodiment, apparatus 70 as depicted in FIG. 14 may operate as an oscillator. FIG. 14 depicts the array 15 of amplification devices 10 disposed on a heatsink layer 40 with a reflector 20 rotationally disposed above the array 15.

Figure 15:
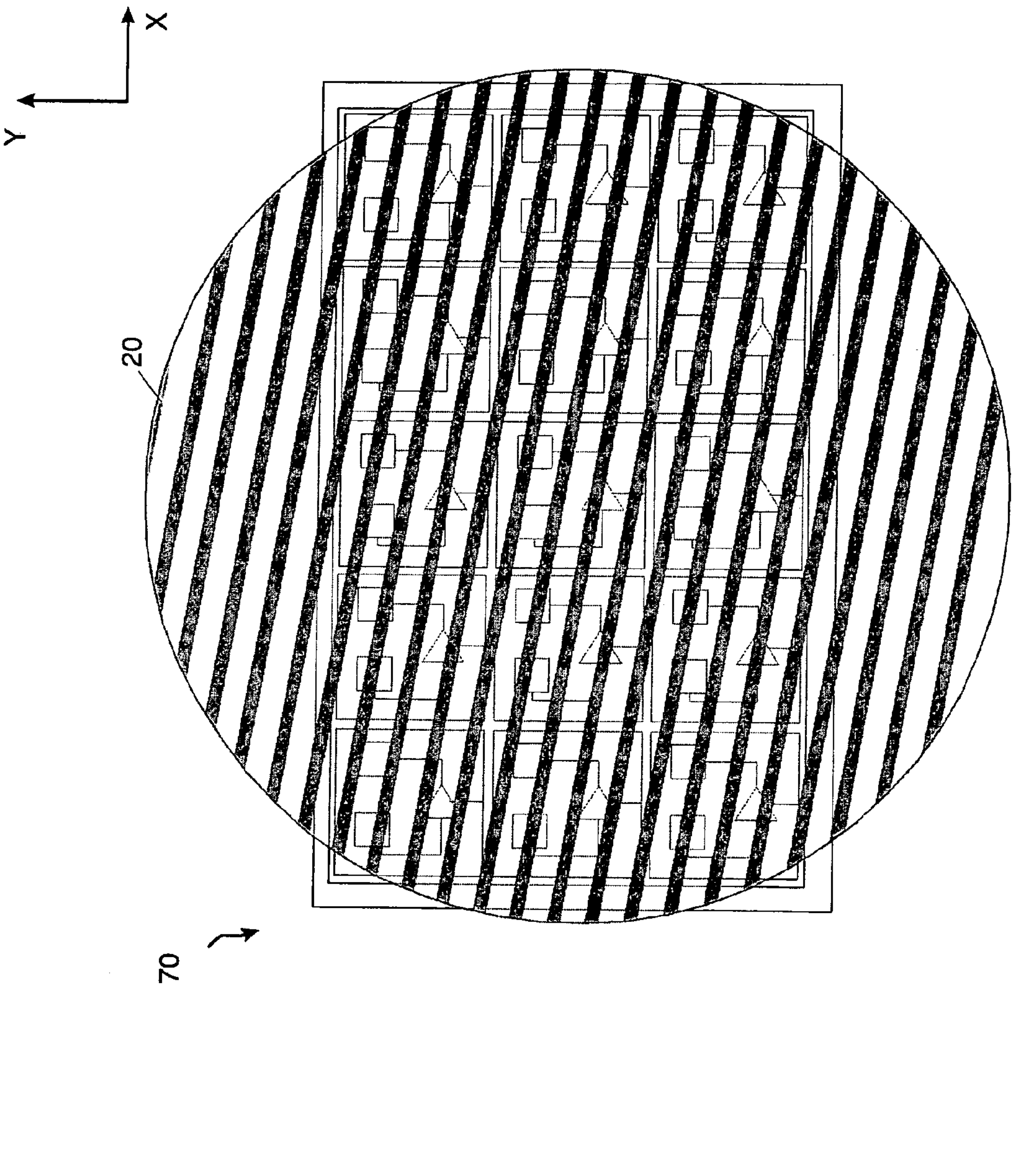
FIG. 15 depicts a top view of the reflector in relation to array of the amplification devices for the apparatus in FIG. 14 in accordance with the present disclosure.

By rotating the reflector 20 so as to position the conductors 50 to be at an angle with the polarization of the input antenna 25 in the X direction, as shown in FIG. 15, the apparatus 70 operates as an oscillator. Any electrical noise in the apparatus 70 is amplified by the amplifier 30 and supplied to the output antennas 26. The output antennas 26 output the energy which reflects off of the conductors 50, is absorbed by the input antennas 25 causing the apparatus 70 to operate as an oscillator.

In FIGS. 15 and 16 the reflector 20 is depicted as being translucent in order to show the array 15 of amplification devices 10 below; however, it should be understood that the reflector 20 may well be opaque and is only shown as being translucent to help depict its overall relation to the underlying structure.

The reflector 20 and the array 15 shown in FIGS. 14 and 15 and the amplification device 10 shown in FIG. 14 are not drawn to scale. The diameter of the reflector 20 may be twice the width of the array 15 and the size of the amplification device 10 may be about ½ of a wavelength of the energy to be transmitted.

The foregoing detailed description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the claims. No claim element herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "step(s) for . . . ."

What is claimed is:

1. An electromagnetic array structure comprising:

a plurality of active amplification devices arranged in an array, wherein an input of each active amplification device is cross polarized with respect to an output of said active amplification device;

a partial reflector disposed in a spaced relation with the plurality of active amplification devices, wherein said partial reflector contains at least one curved major surface; and a plurality of elongated conductors, each disposed along a first major surface of said partial reflector at a first angle to the input of a respective one of the plurality of active amplification devices so as to couple the cross polarized input and output of said active amplification device.

2. The electromagnetic array structure as claimed in claim 1 wherein said partial reflector is rotationally disposed in a spaced relation with the plurality of active amplification devices.

3. The electromagnetic array structure as claimed in claim 1 wherein said partial reflector is rotationally and removably disposed in a spaced relation with the plurality of active amplification devices.

4. The electromagnetic array structure as claimed in claim 1 wherein said electromagnetic array operates as an amplifier by setting said first angle so as to cause incoming energy to be absorbed by the input of each active amplification device, amplified and reradiated in the crossed polarization from the output of each active amplification device.

5. The electromagnetic array structure as claimed in claim 4 wherein said first angle is zero degrees.

6. The electromagnetic array structure as claimed in claim 1 further comprising a heatsink wherein said plurality of active amplification devices are disposed on a major surface of said heatsink.

7. The electromagnetic array structure as claimed in claim 1 further comprising an input waveguide coupled with the plurality of active amplification devices.

8. The electromagnetic array structure as claimed in claim 7 wherein energy waves propagated through the input waveguide reflect off of the conductors into the inputs of each active amplification device and after amplification are at least partially reradiated in a crossed polarization from the output of each active amplification device through the curved partial reflector.

9. The electromagnetic array structure as claimed in claim 1 wherein the conductors are about ⅛ of a wavelength in width.

10. The electromagnetic array structure as claimed in claim 1 wherein the conductors are about 1/50 to about ½ of a wavelength apart.

11. The electromagnetic array structure as claimed in claim 1 wherein the conductors are generally straight lines, crenulated lines or wavy lines.

12. The electromagnetic array structure as claimed in claim 1 wherein said electromagnetic array operates as an oscillator by setting said first angle so as to induce oscillations and synchronize said plurality of active devices to produce coherent power.

13. The electromagnetic array structure as claimed in claim 12 further comprising a heatsink wherein said plurality of active amplification devices are disposed on a major surface of said heatsink.

14. The electromagnetic array structure as claimed in claim 12 wherein said first angle is in a range of about 30 to about 60 degrees.

15. The electromagnetic array structure as claimed in claim 12 wherein energy waves reflect off of the conductors into the inputs of each active amplification device and after amplification are at least partially reradiated in a crossed polarization from the output of each active amplification device through the curved partial reflector.

16. An electromagnetic array structure comprising:

a means for amplifying electromagnetic energy, wherein an input of said means for amplifying electromagnetic energy is cross polarized with respect to an output of said means for amplifying electromagnetic energy;

a means for at least partially reflecting electromagnetic energy rotationally disposed in a spaced relation with the means for amplifying electromagnetic energy and at a first angle to the input of said means for amplifying electromagnetic energy so as to couple cross polarized input and output of said means for amplifying electromagnetic energy.

17. The electromagnetic array structure as claimed in claim 16 wherein said electromagnetic array operates as an amplifier by setting said first angle so as to cause incoming energy to be absorbed by said input of said means for amplifying electromagnetic energy, amplified and reradiated in said crossed polarization from said output of said means for amplifying electromagnetic energy.

18. The electromagnetic array structure as claimed in claim 16 wherein said electromagnetic array operates as an oscillator by setting said first angle so as to synchronize said means for amplifying electromagnetic energy to produce coherent power.

19. A method for operating an electromagnetic array structure as an amplifier or an oscillator, said method comprising:

arranging a plurality of active amplification devices in an array, wherein an input of each active amplification device is cross polarized with respect to an output of each active amplification device;

providing a curved partial reflector in a spaced relation with the plurality of active amplification devices;

providing a plurality of conductors along a first major surface of said partial reflector at a first angle to the input of the plurality of active amplification devices so as to couple cross polarized input and output of each active amplification device;

operating said structure as an amplifier by setting said first angle so as to cause incoming energy to be absorbed by the input of each active amplification device, amplified and reradiated in the crossed polarization from the output of each active amplification device;

operating said structure as an oscillator by setting said first angle so as to synchronize said plurality of active devices to produce coherent power.

20. The method of claim 19, wherein operating said structure as an amplifier comprises rotating said curved partial reflector to a first position.

21. The method of claim 19, wherein operating said structure as an oscillator comprises rotating said curved partial reflector to a second position.

22. The electromagnetic array structure as claimed in claim 16 further comprising a plurality of elongated conductors disposed along a major surface of said means for at least partially reflecting electromagnetic energy.

* * * * *